United States Patent
Fielding et al.

(10) Patent No.: US 6,168,231 B1
(45) Date of Patent: Jan. 2, 2001

(54) TWO PIECE PLASTIC VEHICLE PANEL CONSTRUCTION

(75) Inventors: Russell C. Fielding, Clarkston; Del C. Schroeder, Bloomfield Hills; John D. Burns, West Bloomfield; Bernhard U. Hoffmann, Whitmore, all of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/283,566

(22) Filed: Apr. 1, 1999

(51) Int. Cl.[7] ..................................................... B62D 25/06
(52) U.S. Cl. ............................................. 296/210; 296/191
(58) Field of Search ..................................... 296/191, 210, 296/100.02, 163, 102

(56) References Cited

U.S. PATENT DOCUMENTS

| | | | |
|---|---|---|---|
| 3,427,068 | * 2/1969 | Keahn et al. | 296/210 |
| 5,228,742 | * 7/1993 | Johnson et al. | 296/191 |
| 5,632,673 | 5/1997 | DeRees . | |
| 5,639,155 | 6/1997 | Kowall et al. . | |
| 5,709,426 | 1/1998 | DeRees et al. . | |
| 5,741,045 | 4/1998 | DeRees et al. . | |
| 5,758,896 | 6/1998 | Cruise . | |
| 5,806,620 | 9/1998 | DeRees et al. . | |
| 5,816,606 | 10/1998 | Cruise et al. . | |
| 5,826,948 | 10/1998 | Schroeder et al. . | |
| 5,879,042 | 3/1999 | DeRees et al. . | |
| 5,899,522 | 5/1999 | DeRees et al. . | |
| 5,921,568 | 7/1999 | Cruise et al. . | |
| 5,934,745 | 8/1999 | Moore et al. . | |
| 5,957,563 | 9/1999 | Moore . | |
| 5,964,490 | 10/1999 | Schroeder et al. . | |
| 5,966,984 | 10/1999 | Moore et al. . | |

FOREIGN PATENT DOCUMENTS

| | | |
|---|---|---|
| 3024619 | * 1/1982 | (DE) . |
| 4019121 | * 1/1991 | (DE) . |
| 0041259 | * 3/1982 | (JP) . |

* cited by examiner

Primary Examiner—D. Glenn Dayoan
Assistant Examiner—Patricia Engle
(74) Attorney, Agent, or Firm—Marc Lorelli

(57) ABSTRACT

A two piece vehicle panel construction is provided. The first and second piece of the vehicle panel are made by injection molding. The first and second piece cooperate to provide proper aesthetics, structural integrity, and increased sun load resistance. The proper positioning and alignment of the two piece construction is facilitated by at least two alignment fixtures that are nested within the first and second pieces.

16 Claims, 5 Drawing Sheets

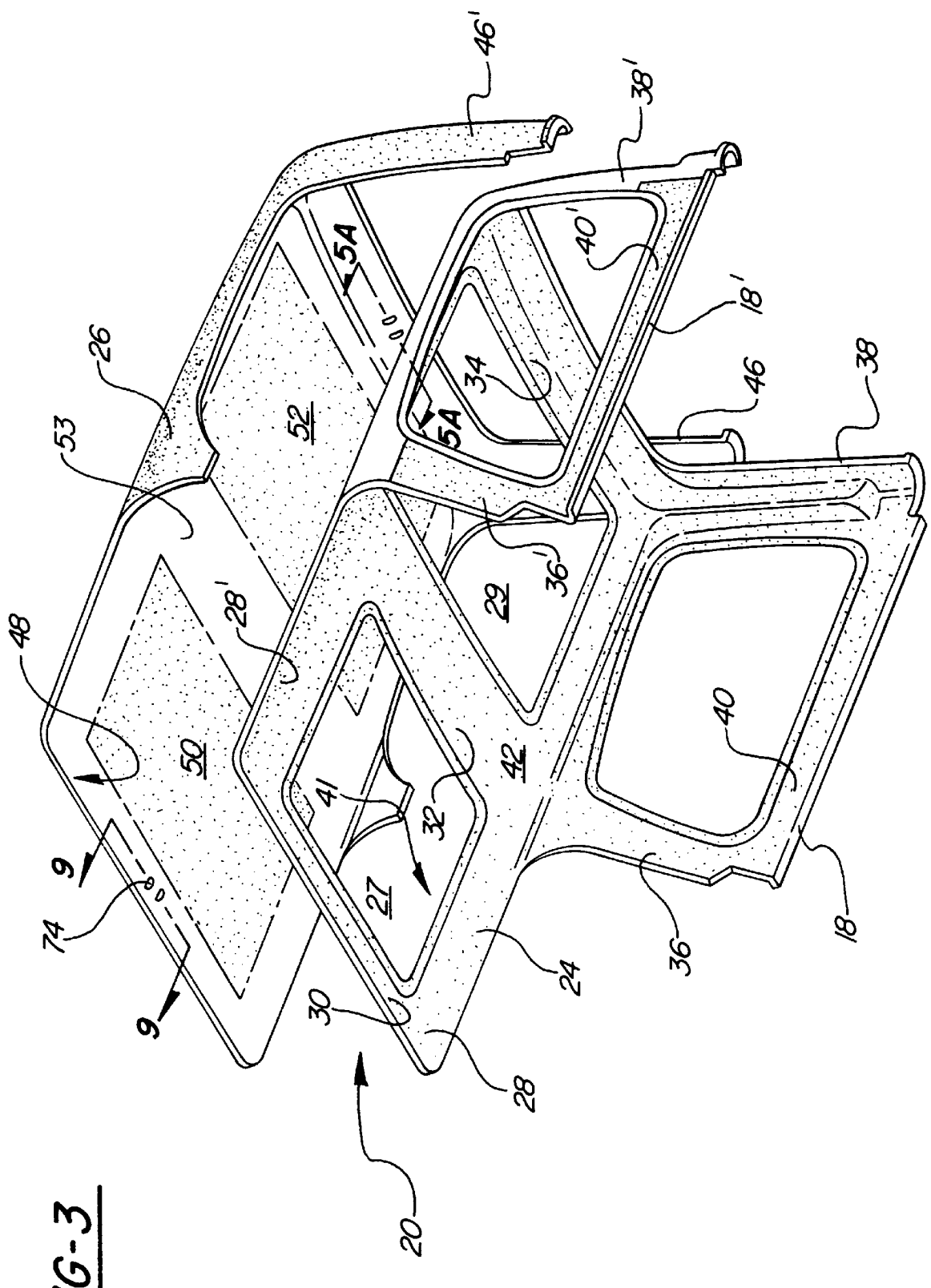

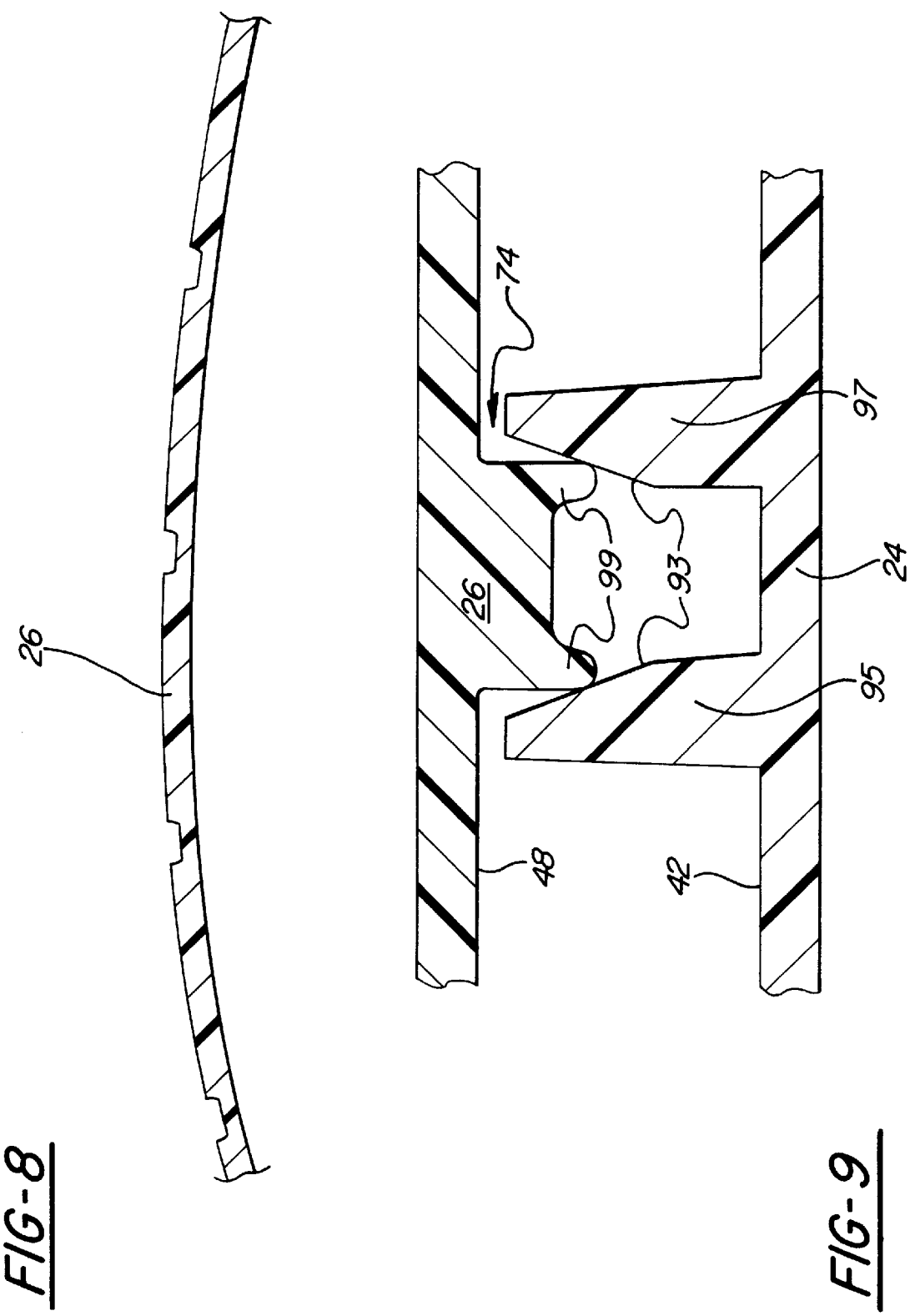

TWO PIECE PLASTIC VEHICLE PANEL CONSTRUCTION

BACKGROUND OF THE INVENTION

1. Technical Field

The present invention generally relates to plastic panels. More particularly, the present invention relates to plastic vehicle panels that are comprised of more than one piece. More specifically, but without restriction to the particular embodiment and/or use which is shown and described for purposes of illustration, the present invention relates to a two piece injection molded vehicle panel that provides structural rigidity as well as an aesthetic appearance.

2. Discussion

A major trend in the automotive industry is to produce vehicles that are lighter than previous vehicles. This is typically performed in order to achieve the fuel economy benefits inherent in a lighter vehicle. Another major trend in the automotive industry is to produce vehicles that are less expensive to manufacture than its predecessors. This is performed in order to increase the profit margin per vehicle sold in the marketplace. The auto industry has been in a seemingly never-ending struggle to produce vehicles that are lighter and less expensive than previous vehicles.

Vehicle body panels have been in the flux of change in response to these trends. Traditionally, vehicle panels have been made of steel or some type of composite material. The outside of the panel is typically painted and the inside of the panel, those portions adjacent to the passenger cabin of the vehicle, are covered by a plastic trim piece in order to provide an aesthetically pleasing surface for the passengers of the vehicle. Other systems have also been utilized to provide a show surface on both the interior and the exterior of the panel.

Injection molding of a plastic material has been a method for producing parts that reduces the weight and cost of these type of panels. Unfortunately, it is very difficult to provide injection molded plastic in a vehicle panel size sufficient for this type of application. It is difficult to provide molds that are large enough to handle such a large panel. In addition, it is difficult to achieve proper flow through such a large area. This can lead to many problems, one major problem is developing a show surface that is aesthetically pleasing. Typically, larger panels of this type are made from materials or molding operations that require paint to provide an aesthetically pleasing show surface. Painting a panel adds considerable cost to the vehicle and is, therefore, undesirable. Additionally, with injection molding panels, the panels are typically removed with ejector pins which can cause marks on the on the panels as they are still warm and malable from the injection molding process. Not only is it difficult to produce large injection molded plastic pieces, but it is also difficult to provide a plastic part that produces a system that provides structural rigidity as well as an aesthetic appearance acceptable for vehicle body panels.

There is, therefore, a need to provide large plastic panels that can be used on a motor vehicle. Such a panel must meet certain ultra-violet standards, strength standards as well as surface texture standards. There is also a need to provide large plastic panels that possess structural integrity as well as a textured or show surface on both the interior and exterior surfaces such that it does not require paint to be aesthetically pleasing.

SUMMARY OF THE INVENTION

Accordingly, it is a principal objective of the present invention to provide a a vehicle panel system that provides a show surface on both the interior and exterior of the panel.

It is another objective of the present invention to provide a two piece injection molded system that can be effectively combined to produce a panel with enough structural integrity to be utilized as a body panel for a motor vehicle.

It is still another objective of the present invention to provide a plastic vehicle panel that will not deform with high temperature or sun loads.

In one form, the present invention provides a two piece vehicle panel made by injection molding. The panel includes a first piece and a second piece. The first piece includes two longitudinally extending and parallel structures and at least two cross members interconnecting the two structures. The first piece also includes at least one downwardly extending pillars that terminates in a base formation. The base formation is adapted to be secured to the vehicle body via bolts, screws, clips, or the like. The first piece has an inner surface that is suitable for display and an outer surface that has portions thereof suitable for display. The second piece includes a generally planar top surface that attaches to the cross members of the first piece to provide support thereto. The second piece also includes at least one projection extending downward from the planar top surface that is cooperative with the downwardly extending pillar of the first piece to create a structural channel. The second piece has an outer surface that is suitable for display and includes portions of its inner surface that are suitable for display.

The planar top surface of the second piece is directly subjected to sun load due to its relative position with the vehicle, while concealing the cross members and the longitudinal structures from direct sun load. The planar top surface includes a crown so as to prevent sink from prolonged sun load.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is an exploded view of a vehicle body panel including a first piece and a second piece from an angle significantly lower than the viewing angle of FIG. 2;

FIG. 8 is a cross sectional view of the assembled vehicle body panel along the line 8—8 of FIG. 1; and FIG. 9 is a cross sectional view of the front alignment fixture illustrating the fixture in its operable position.

DETAILED DESCRIPTION OF THE PREFERRED EMBODIMENT

Figure 1:
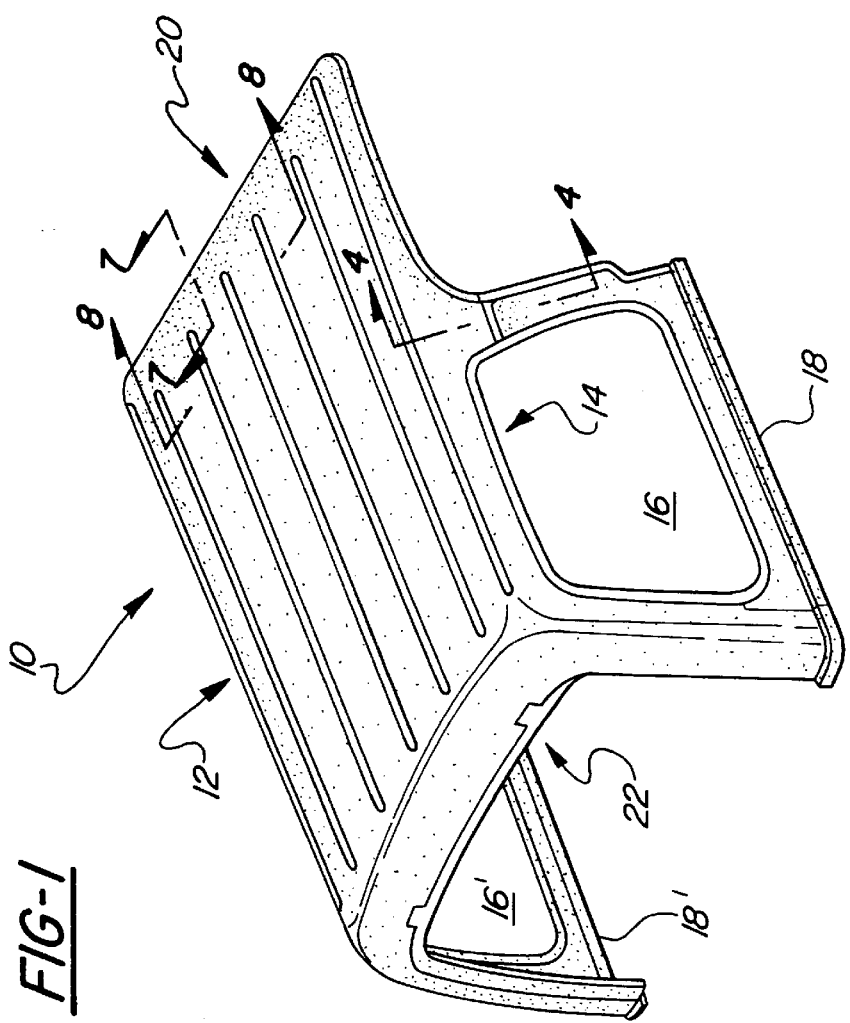
FIG. 1 is a perspective view of a vehicle body panel assembly.

Referring now to the drawings, there is depicted an assembled vehicle panel having structural rigidity and surfaces suitable for display on both sides embodying the concept of the present invention. FIG. 1 illustrates an assembled vehicle body panel 10. Panel 10 is designed to be utilized as the roof panel of a motor vehicle, such that the exterior surface 12 is exposed to the environment and the interior surface 14 is exposed in the vehicle cabin. Openings 16 and 16' are provided for the installation of a rear quarter window (not shown). Edges 18 and 18' are designed to attach to the lower portion of a vehicle body via screws or bolts. Panel 10, preferably, attaches to a front windshield frame at its forward-most end 20. Panel 10 also has the ability for an opening rear window to attach to it at its rearward-most end 22. Panel 10 is constructed from injection molded plastic, preferably PET (polyethylene terephthalate), or a Polypropelene/Polystyrene blend, or other structural polymer blends.

Figure 2:
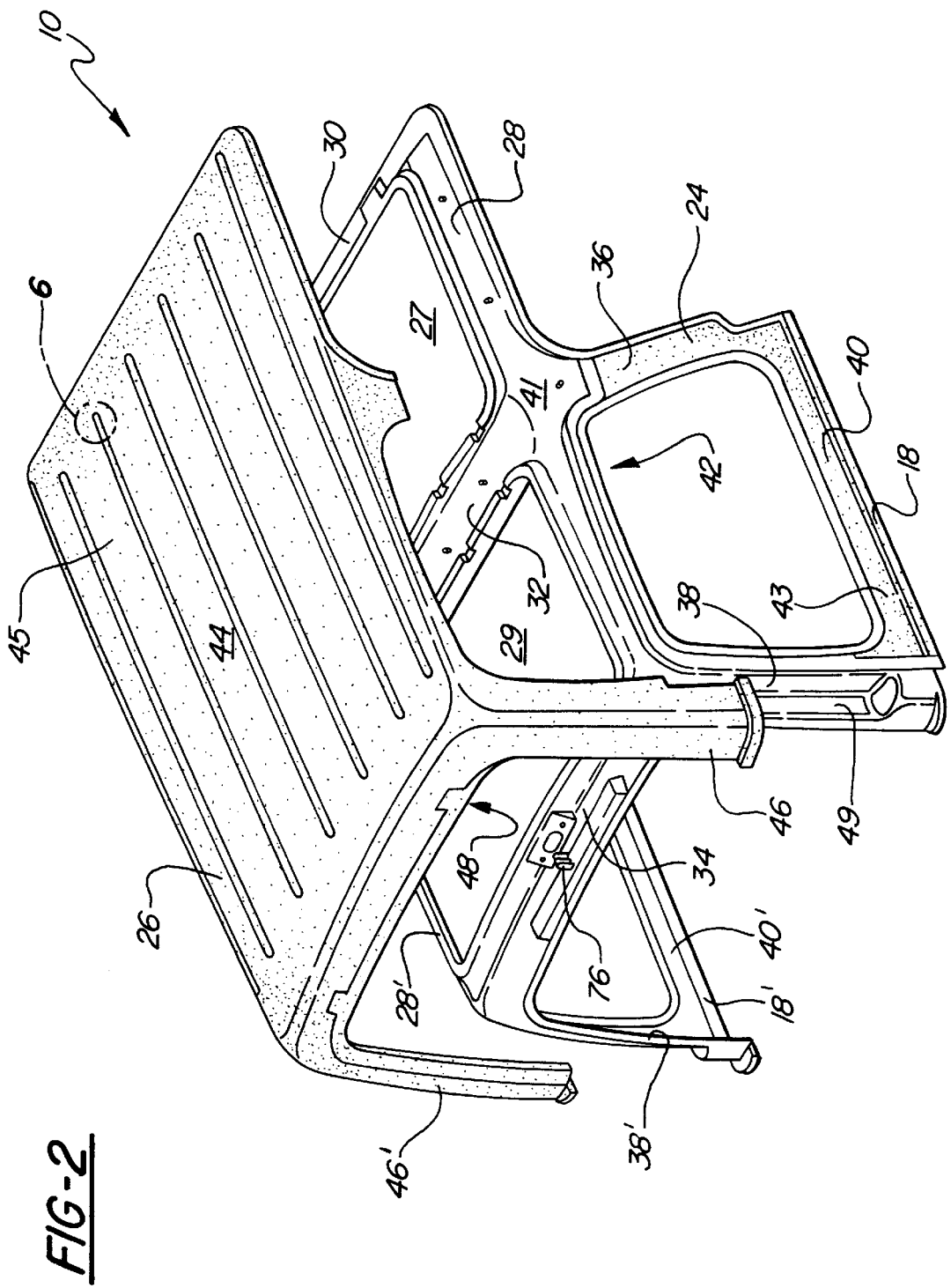
FIG. 2 is an exploded view of a vehicle body panel including a first piece and a second piece from an elevated angle.

FIG. 2 and FIG. 3 illustrate vehicle body panel 10 disassembled. Panel 10 includes a first piece 24 and a second piece 26. First piece 24 has two longitudinally extending structures 28 and 28' that are substantially parallel. Forward cross-member 30, middle cross-member 32, and rearward cross-member 34 interconnect structures 28 and 28' to create a framework having a front opening 27 and a rear opening 29. Cross-members 30, 32, and 34 are substantially parallel to one another. Extending downward from each of the junctions made by middle cross member 32 and longitudinally extending structures 28 and 28' are forward pillars 36 and 36' (36' not shown in FIG. 2). Extending downward from each of the junctions made by rearward cross member 34 and longitudinally extending structures 28 and 28' are rearward pillars 38 and 38'. Rearward pillar 38 and forward pillar 36 are connected on their lowest edge by base formation 40. Conversely, rearward pillar 38' and forward pillar 36' are connected on their lowest edge by base formation 40'. Base formations 40 and 40' extend along the lower length of panel 10 and terminates in edge 18 and 18' that provides attaching means to the vehicle body (not shown). The attaching means could be bolts, screws, clips, or adhesive. In the preferred embodiment, the base formations 40 and 40' attach to the vehicle body via bolts (not shown). The inner surface 42 of first piece 24 is all grained or textured in some way. This provides surface 42 with aesthetically pleasing attributes for a plastic material, thereby making inner surface 42 suitable for display. The outer surface 41 has portions 43 thereof suitable for display as well. The first piece 24 provides structural rigidity to the assembly 10. Base formations 40 and 40' attach to a vehicle body to create a forward end 20 which attaches to a windshield frame, these aspects along with the ladder structure formed by members 28, 28', 30, 32, and 34 provide a structural part with strength to the vehicle panel 10 with a minimal amount of weight. Each plastic piece is produced by an injection molding process. By utlizing an injection molded process and the aforementioned materials, colored plastic can be produced by the addition of a dye or resin to the raw plastic material. The plastic material is heated and then forced under pressure into a mold space of a mold. The plastic part ultimately takes the form of the mold space. Most molds are made of steel or aluminum in order to provide the necessary heat transfer characteristics. Typically, the surface of the mold, that defines the mold space is sand blasted to create a textured or grained surface in the mold. By creating such a textured or grained surface on the mold the resulting plastic part produced from that mold will have a complimentary textured or grained show surface. By graining the mold of an injection molded part, the resultant surface will be suitable for display so long as ejector pins and the like do not contact this surface while the part is still malable. The first piece 24 is formed in a mold having a top component and a core component that define the top and bottom surfaces of the mold space. The top component is adapted to vertically raise after the molding process. It should be appreciated that portions of the top component that contact the mold space are grained. The core component is outfitted with horizontal lifters that contract within said core component to effectively unlock the first piece 24. It should further be appreciated that the core component that forms the inner surface 42 of the first piece 24 is completely grained. The first piece 24 can then be lifted off by hand or by some other means such as by suction cups or straps. It should also be appreciated that numerous slides are provided in the components to aid in ejecting the completed piece from the mold.

The second piece 26 of the vehicle panel 10 is designed to attached to the first piece. The second piece includes an outer surface 45 having generally planar top surface 44 and two downwardly extending projections 46 and 46'. Projections 46 and 46' are suitable to attach to rearward pillars 38 and 38'. The inner surface 48 of second piece 26 includes two substantially rectangular portions 50 and 52 of grained or show surface, as best illustrated in FIG. 3. The remaining portions 53 of the bottom surface are not grained. It can be appreciated that grained portions 50 and 52 cooperate with openings 27 and 29 of first piece 24 so as to provide an interior surface 14 of panel 10 that is grained. The second piece 26 attaches to the exterior of the first piece 24. The second piece 26 substantially covers the first piece 24 except for the portions 43 thereof that are suitable for display. The entire outer surface 45 of the second piece is suitable for display. It can be appreciated that the first piece 24 and the second piece 26 not only cooperate to produce complete show surfaces but also complement each other structurally. Second piece 26 is disposed over the first piece 24 such that a channel 49 is formed in the rear pillars 38 of the vehicle. Channel 49 is bound on one side by rearward pillars 38 and 38' and the other side by projections 46 and 46'. This type of arrangement provides strength to the rear pillars. The second piece 26 is formed in a mold having a top component and a core component that define the top and bottom surfaces of the mold space. The top component is raised vertically to remove the piece from the mold. It should be appreciated that the top component that forms the outer surface 45 of the second piece 26 is completely grained. After the top component is raised, ejector pins are activated on the core component to lift or disengage the piece from the core component of the mold. The ejector pins do create surface marks that compromise the appearance of the piece, therefore, the ejector pins are disposed on portions 53 of the second piece 26 that are not visible when panel 10 is assembled. Thereby allowing the complete interior surface 14 of panel 10 to be grained and suitable for display. It should be appreciated that the first and second piece are adapted to cooperate to produce an assembled panel that has an interior surface 14 and an exterior surface 12 that is suitable for display.

Figure 4:
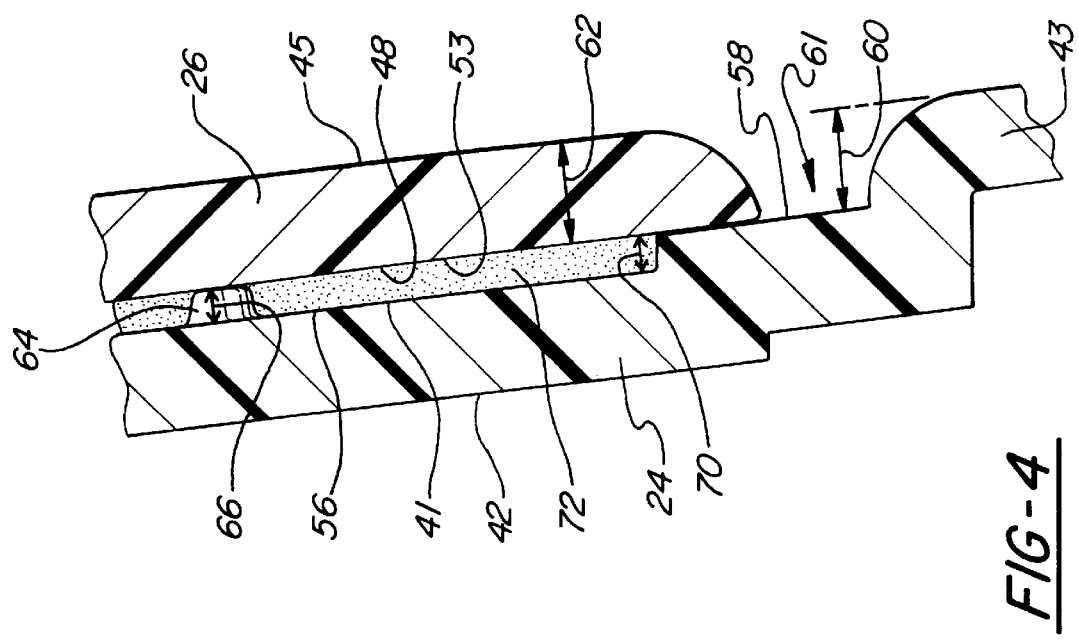
FIG. 4 is a cross sectional view along the line 4—4 of FIG. 1.

Turning to FIG. 4, a cross-sectional view along a bonding surface is provided. The inner surface 42 of the first piece 24 is exposed in the cabin of the vehicle and is grained. The outer surface 41 is illustrated with grained portion 43 as well as a bonding surface 56 that is not grained. The outer surface 45 of the second piece 26 is grained. The inner surface 48 illustrated in FIG. 4 as the portion 53 that is not grained in this locale. The first piece 24 includes a grained portion 43 adjacent to an attaching platform 58. Platform 58 is disposed a distance 60 from the grained portion 43 slightly greater than the thickness of the second piece 26, as defined by numeral 62. It should be appreciated that platform 58 is disposed substantially along the joint 61 between the first piece 24 and the second piece 26. First piece 24 includes at least one standoff 64 having a height 66. Standoff 64 extends from a surface 56 of the outer surface 41 not suitable for display. Surface 56 is disposed a level below platform 58. It can be appreciated that the height 66 of standoff 64 is slightly larger than the distance 70 that surface 56 is disposed below platform 58. Adhesive 72 is disposed such that it contacts the portion 53 of the inner surface 48 of the second piece that is not grained and the surface 56 of the outer surface 41 of the first piece 24 that is not grained. The height 66 of standoff 64 is preferably equivalent to the minimum bonding thickness of the adhesive 72. It can also be appreciated that the attaching platform 58 acts as a glue damn to limit the flow of adhesive toward the exterior surface 12 of the assembled panel 10. It should be appreciated that the first piece 24 and the second piece 26 can be attached by various means such as clips, bolts, screws, and the like.

Figure 5A:
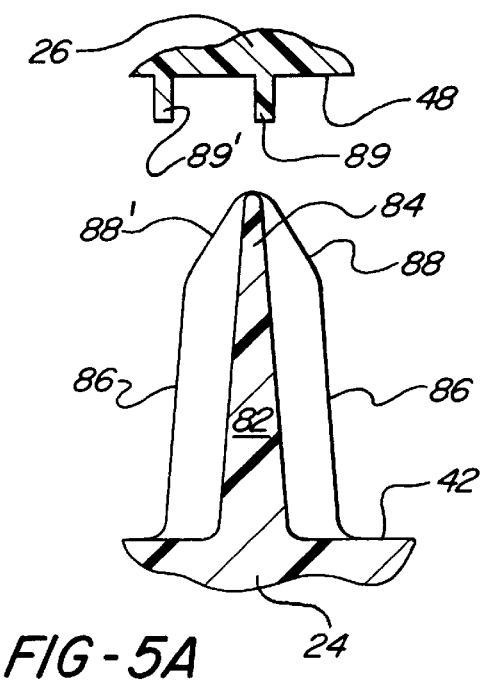
FIG. 5A is a cross sectional view of the rear alignment fixture along the line 5A—5A of FIG. 3.
Figure 5B:
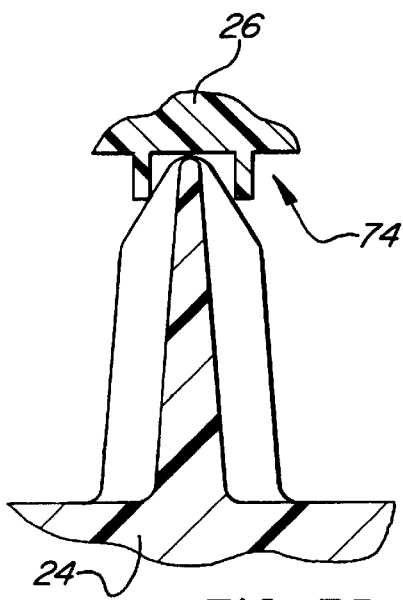
FIG. 5B is a cross sectional view of the rear alignment fixture illustrating the fixture in its operable position.

FIGS. 5A and 5B illustrate the rear alignment fixture needed to position the first piece 24 and the second piece 26 in proper position with respect to each other. There are, preferably, two alignment fixtures 74 and 76, as shown in FIGS. 2 and 3. Alignment fixture 74 is disposed at the forward-most end 20 of the panel 10 and fixture 76 is disposed at the rearward-most end 22 of the panel 10. Alignment fixture 76 is disposed in a nested arrangement with the first piece 24 and the second piece 26 such that when panel 10 is assembled, neither alignment fixture is visible on the interior 14 or exterior 12 surface. The inner surface 48 of second piece 26 carries a pair of skis 89 and 89' disposed a distance 80 apart. The inner surface 42 of the first piece 24 carries a projection 82. Projection 82 includes a central formation 84 and two side formations 86 and 86' each interconnected by an outboard angled ledge 88 and 88'. Each Ski 89 and 89' is designed to cooperate with an angled ledge 89 and 89' such that central formation 84 contacts the inner surface 48 of the second piece 26. This provides an alignment between the first piece 24 and the second piece 26 as shown in FIG. 5B. Alignment fixture 74 at the forward-most end 20 of the panel 10 is illustrated in FIG. 9. It should be appreciated that the inner surface 42 of the first piece 24 carries two formations 95 and 97 to hold skis 99 therebetween. Each formation 95 and 97 includes an inboard angled ledge 93 for contacting the skis 99. It should be appreciated that the skis 89 and 89' of the rear fixture 76 are disposed to span the central formation 84 while the skis 99 of the front formation are disposed between formation 95 and 97.

Figure 6:
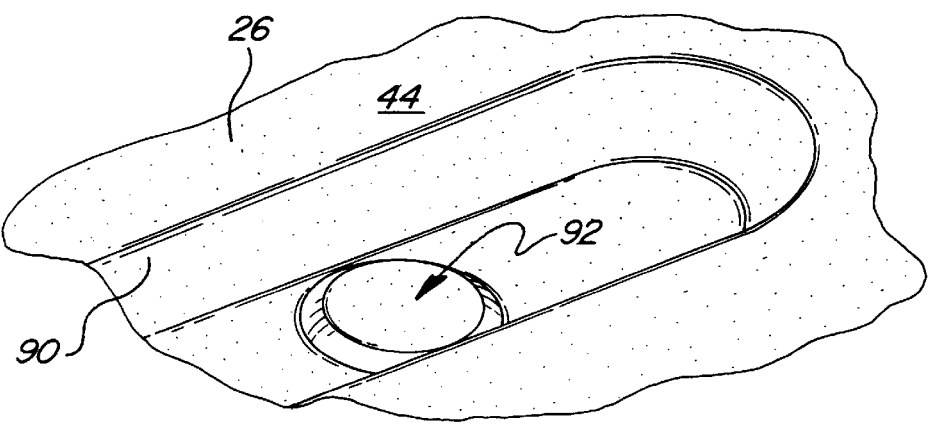
FIG. 6 is an enlarged view of the area identified by the numeral 6 in FIG. 2.

During the injection molding process, plastic material is introduced into the mold space by an injector head. At the placement of the injector head the plastic is typically marked in some way due to the inherent differences between the injector head and the surrounding mold. These differences are typically temperature differences and parting line creation between the head and the mold. This will typically lead to formation similar to mark 92 shown in FIG. 6. The top surface 44 of the second piece 26 includes a plurality of longitudinally extending depressions 90 formed thereon. As is shown, the injector head is position in a depression 90 to help conceal the unsightly mark.

Figure 7:
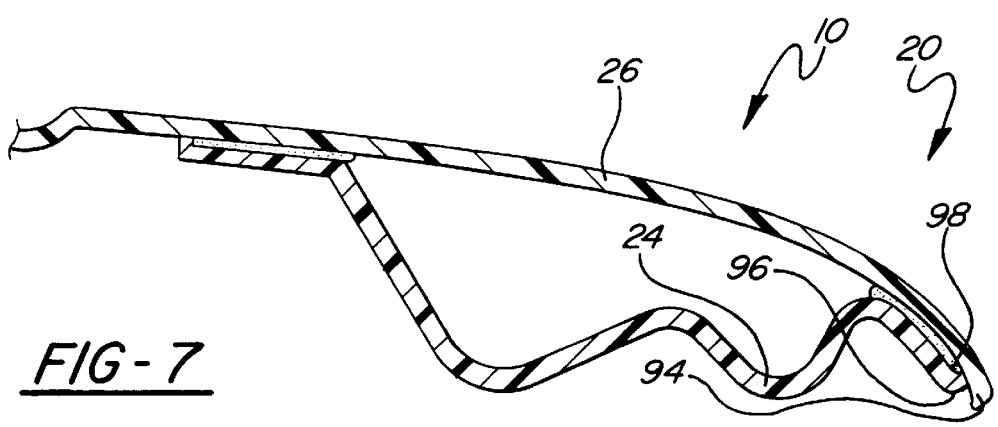
FIG. 7 is a cross sectional of the assembled vehicle body panel along the line 7—7 of FIG. 1.

FIG. 7 illustrates the forward most end 20 of the assembled panel 10. The second piece 26 includes a teardrop structure 94 extending to cover the front edge 96 of the first piece 24. This design limits wind noise created from panel 10 as the vehicle is in motion. Without the teardrop 94 wind may flow against joint 98 causing wind noise and possible early deterioration of joint 98.

FIG. 8 illustrates a cross sectional view of vehicle panel 10. Second piece 26 is designed with a crown of sufficient degree. The crowning of the second piece 26 creates an outward movement of said piece as the surrounding temperature is increased. Typically, a plastic material increases in size as the temperature increases. In a vehicle setting, the second piece 26 will increase in temperature due to sun load and will therefore expand. However the first piece 24, not shown in FIG. 8, will not expand as significantly because it is not directly affected by sun load. By the nature of the two piece vehicle panel construction as the outer panel expands, it is still held in place at certain attachment locations to the first piece. Therefore, the expansion that occurs increases the degree of the crown. Other plastic vehicle panels have not been designed with a similar two piece construction with the aforementioned crown, therefore, as the temperature increases due to sun load, the panel tends to sink or form a depression therein. After repeated sun loads, the part may form to that sunken shape that will pool water and other unsightly articles on the top of the vehicle panel.

While the above description constitutes the preferred embodiment of the invention, it will be appreciated that the invention is susceptible to modification, variation, and change without departing from the proper scope or fair meaning of the accompanying claims.

What is claimed is:

1. A vehicle panel having an exterior surface exposed to the environment and an interior surface exposed to the vehicle cabin, said vehicle panel comprising:
    a first piece having an inner and an outer surface made by injection molding, said first piece having an inner surface suitable for display and an outer surface with portions thereof suitable for display, wherein said first piece forms a part of said exterior surface and a part of said interior surface;
    a second piece attached to said first piece also made by injection molding, said second piece having an inner surface with portions thereof suitable for display and a outer surface suitable for display, wherein said second piece forms a part of said exterior surface and a part of said interior surface; and
    attachment means disposed between said outer surface of said first piece for attachment to said inner surface of said second piece;
    wherein said suitable for display surfaces are produced by a grained mold and do not come in contact ejector pins while still malable from said injection molding process.

2. The invention as set forth in claim 1, wherein said attachment means includes adhesive disposed on said outer surface of said first piece and said inner surface of said second piece.

3. The invention as set forth in claim 2, further comprising a standoff disposed between said outer surface of said first piece and said inner surface of said second piece.

4. The invention as set forth in claim 3, wherein said standoff has a length greater than or equal to the minimum adhesive thickness necessary to effectively attach said first and second pieces.

5. The invention as set forth in claim 4, wherein said outer surface of said first piece includes a glue damn disposed substantially along the joint between said first piece and said second piece.

6. The invention as set forth in claim 1, further including an alignment fixture disposed about the center line of said first piece cooperative with a mating alignment fixture disposed about the center line of said second piece.

7. The invention as set forth in claim 6, wherein said alignment fixture is disposed on said outer surface of said first piece and said mating alignment fixture is disposed on said inner surface of said second piece such that said alignment fixtures are not visible when said first piece and said second piece are attached.

8. The invention as set forth in claim 1, wherein said second piece includes a tear drop formation on the forward most end thereof that extends vertically below the front edge of said first piece.

9. The invention as set forth in claim 1, wherein said second piece includes a plurality of longitudinally extending depressions formed therein.

10. A vehicle panel comprising:
- a first piece having an inner and an outer surface made by injection molding, said first piece having an inner surface suitable for display and an outer surface with portions thereof suitable for display;
- a second piece attached to said first piece also made by injection molding, said second piece having an inner surface with portions thereof suitable for display and a outer surface suitable for display; and
- attachment means disposed between said outer surface of said first piece for attachment to said inner surface of said second piece;
- wherein said suitable for display surfaces are produced by a grained mold and do not come in contact ejector pins while still malable from said injection molding process; wherein said second piece includes a plurality of longitudinally extending depressions formed therein; and wherein said depressions include a mark caused by an injector head during the injection molding process.

11. In a vehicle having a vehicle body with an exterior surface exposed to the environment, a vehicle panel comprising:
- a first piece having an inner and an outer surface made by injection molding, said first piece including two parallel and longitudinally extending structures and at least two cross members interconnecting said two longitudinally extending structures, said first piece also includes at least two downwardly extending pillars terminating in a base formation adapted to be secured to the vehicle body; and
- a second piece attached to said first piece also made by injection molding, said second piece includes a generally planar top surface that attaches to said cross members of said first piece, said first piece attaches to and provides support for said second piece, wherein portions of said first piece form a portion of the exterior surface of said vehicle body.

12. The vehicle panel as set forth in claim 11, wherein said second piece includes a projection extending downward from said planar top surface, said projection cooperative with one of said pillars of said first piece to create a structural channel.

13. The vehicle panel as set forth in claim 12, wherein said at least two cross members include a forward cross member and a rearward crossmember.

14. The vehicle panel as set forth in claim 13, wherein said second piece includes a tear drop formation extending downward from a forward edge thereof, said tear drop formation being disposed below and adjacent to said forward cross member.

15. In a vehicle having a body, a vehicle panel comprising:
- a first piece having an inner and an outer surface made by injection molding, said first piece including two parallel and longitudinally extending structures and at least two cross members interconnecting said two longitudinally extending structures, said first piece including a front and rear alignment fixture each including at least one formation projection from said first piece; and
- a second piece attached to said first piece also made by injection molding, said second piece includes a generally planar top surface that attaches to said cross members and said longitudinally extending structures of said first piece, said second piece includes a mating front and rear alignment fixture each including a pair of ski formations, said generally planar top being subject to direct sun load while concealing said cross members and said longitudinally extending structures from direct sun load, said generally planar surface includes a crown so as to prevent sink from prolonged sun load;
- wherein said front alignment fixture and said mating front alignment fixture are nested between said outer surface of said second piece and said inner surface of said first piece so as to be hidden from sight in the assembled panel.

16. The invention as set forth in claim 15, wherein said rear mating alignment fixture includes a formation substantially disposed between said skis of said rear alignment fixture of said first piece and wherein said front mating alignment fixtures includes two formations disposed such that said skis of said front alignment fixture of said first piece can be positioned therebetween.

\* \* \* \* \*